UNITED STATES PATENT OFFICE.

MAX HESSENLAND, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

BLUE DYESTUFF AND PROCESS OF MAKING SAME.

998,772.  Specification of Letters Patent.  Patented July 25, 1911.

No Drawing.  Application filed October 31, 1910.  Serial No. 589,997.

*To all whom it may concern:*

Be it known that I, MAX HESSENLAND, Ph. D., chemist, a citizen of the Empire of Germany, residing at Höchst-on-the-Main, Germany, have invented certain new and useful Improvements in Blue Dyestuff and Processes of Making Same, of which the following is a specification.

I have found that by causing dehydrating agents to act upon 1.4-aminoanthraquinonyl-anthranilic acid, a greenish-blue dyestuff is obtained, which is remarkable for its properties and which can be used both as a pigment dye and as a vat dye.

The new product is the 4-amino-anthraquinone-α-acridone, the formation of which from the 1.4-amino-anthraquinonyl-anthranilic acid may be interpreted by the following formulæ:

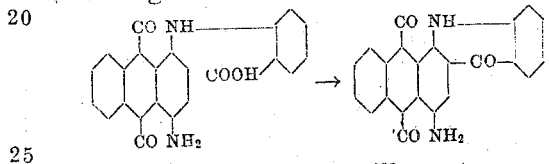

The following example illustrates my invention: 1 kilo of 1.4-amino-anthraquinonyl-anthranilic acid is dissolved at 0° C. in 10 liters of chlorosulfonic acid and stirred at 10-20° C. until there is no more unchanged anthranilic acid. On pouring the mass upon ice, the condensation-product separates. It forms a greenish-blue powder, insoluble in water, alcohol, ether, scarcely soluble in glacial acetic acid, but capable of being recrystallized from nitrobenzene. The color of its solution in concentrated sulfuric acid is brown. When treated with alkaline hydrosulfite it yields a violet vat which dyes cotton, on oxidation in the air, beautiful greenish-blue tints.

Having now described my invention, what I claim is:

1. As a new product, the 4-amino-anthraquinone-α-acridone obtainable from the 1.4-amino-anthraquinonyl-anthranilic acid, being a greenish-blue powder, insoluble in alcohol, ether and water, scarcely soluble in glacial acetic acid, capable of being recrystallized from nitrobenzene, soluble in concentrated sulfuric acid to a brown solution, in alkaline hydrosulfite to a violet solution, yielding a vat which dyes cotton, on oxidation in the air, bright greenish-blue tints.

2. The process of producing 4-amino-anthraquinone-α-acridone, which consists in treating 1.4-amino-anthraquinonyl-anthranilic acid with dehydrating agents.

3. The process of producing 4-amino-anthraquinone-α-acridone, which consists in treating 1.4-amino-anthraquinonyl-anthranilic acid with chlorosulfonic acid.

In testimony whereof, I affix my signature in presence of two witnesses.

MAX HESSENLAND.

Witnesses:
 JEAN GRUND,
 CARL GRUND.